April 16, 1968 W. H. HARRIS, JR 3,378,361
METHOD OF MAKING A TOOL FOR REMOVING MATERIAL
FROM WORKPIECES AND PRODUCT THEREOF
Filed Jan. 29, 1965

INVENTOR.
WILLIAM H. HARRIS, JR.
BY
Barnes, Kisselle, Raisch & Choate
ATTORNEYS

United States Patent Office 3,378,361
Patented Apr. 16, 1968

3,378,361
METHOD OF MAKING A TOOL FOR REMOVING MATERIAL FROM WORKPIECES AND PRODUCT THEREOF
William H. Harris, Jr., Detroit, Mich., assignor to Dexco Corporation, Detroit, Mich., a corporation of Michigan
Filed Jan. 29, 1965, Ser. No. 428,947
15 Claims. (Cl. 51—293)

ABSTRACT OF THE DISCLOSURE

A multiplicity of tungsten carbide grits are adhered to a nickel-chromium alloy coating on a metal substrate by means of a tacky brazing compound adjusted to contain less copper than that required to make an effective brazed connection. The assembly is heated to melt the copper which wets the alloy and the grits and which promotes the formation of an extremely strong bond between the alloy and grits when the assembly is further heated to the melting point of the alloy and subsequently cooled.

---

This invention relates to a method of making tools capable of removing material from either relatively hard workpieces, such as those made of steel, or relatively soft, resilient workpieces, such as those made of rubber. With respect to workpieces of steel and the like, the tools are capable of performing such operations as are usually referred to as shaving, honing, grinding, and the like. An example of use of the tool with respect to soft, resilient workpieces is rough and finish abrading or grinding of rubber tires during the course of their manufacture.

Conventional hones and coarser types of grinding stones comprise a large number of small grits of silicon carbide, aluminum oxide, or the like bonded together in a matrix of glasslike material. The process of making such articles is relatively slow and expensive, since they must be heated over a long period of time under very carefully controlled conditions. However, even under the best controlled heating conditions, the articles in a single batch frequently vary materially from each other, particularly as to hardness, which results in non-uniform honing or grinding capabilities and wear at unpredictable, non-uniform rates.

The accepted theory of hone or grind wheel functioning is that the stone must be made so that it will gradually crumble or disintegrate during use to release the metal removed from the workpiece and permit its removal from the work area of the stone. The "wear" of a conventional stone is actually this gradual disintegration into abrasive particles. If the stone is too hard, it fails to crumble and its pores become loaded with metal removed from the workpiece, thereby destroying its honing or grinding capability. If the stone is not hard enough, it wears out prematurely.

These non-uniform factors, particularly in automated production lines where these articles are used, result in an undesirable non-uniformity of product and costly stoppages of an entire production line when one of the hones or grinders becomes loaded or wears out prematurely.

Moreover, the abrasive particles formed by crumbling of the stone often become imbedded in the workpiece in sufficient quantity to cause objectionable abrasive action on parts of a mechanism which have moving contact with the ground or honed part.

In the manufacture of many parts such as gears and splines, the workpiece is first roughly formed as by hobbing and then is given its final configuration by a shaving tool. The articles is then hardened as by heat treating. Almost invariably, the heat treating distorts the part so that the finished product no longer has the accurate configuration that it had after the shaving step. With respect to the vast majority of products made in this manner, it has not been economically feasible, but the use of conventional tools, to correct the distortion caused by the heat treating. Shaving after heat treating is a virtual impossibility because of the hardness of the heat-treated article.

An object of this invention is to provide a relatively simple, inexpensive method of making a long-lived tool capable of honing, grinding either hard or soft resilient materials, or performing the equivalent of a shaving operation on a hardened workpiece; which will wear uniformly at a predictable rate, which has the property of wearing down as distinguished from distintegrating, and which, nevertheless, will not become loaded during use.

Generally, the invention contemplates providing a coating of tungsten carbide grits on a substrate under such conditions that the grits cannot be pulled off of the substrate by the relatively greater shear forces incidental to use in such operations as honing, grinding, shaving, and the like.

More particularly, the substrate is provided with a layer of bonding metal which will form a bond with tungsten carbide and which has a melting point higher than that of copper. To provide an extremely strong bond between the substrate and bonding metal, the substarte is first shot blasted and the bonding metal in fluent form is sprayed onto the shot-blasted surface under such conditions that substantially no oxides or foreign matter exists between the substrate and bonding metal.

A layer of the grits and a brazing compound is applied over the layer of bonding metal, the brazing compound being used to temporarily adhere the grits to the bonding metal. The brazing compound contains a very small amount of copper, much less than that ordinarily required in brazing procedures. The bonding metal, grits, and brazing compound are then heated above the melting point of copper to that of the bonding metal to form a fused metal connection between the grits and bonding metal. The assembly is then cooled to solidify the materials forming this connection. The copper performs an important function in the formation of a strong bond in the fused metal connection as is brought out in detail below.

Figure 1:
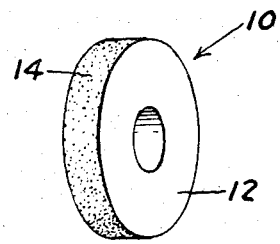
FIG. 1 is a partly diagrammatic perspective view of a tool in the form of a wheel made in accordance with this invention.

Shown in FIG. 1 is a tool 10 made in accordance with the method of this invention. The tool is shown as being a disc-shaped wheel, but it could comprise a rectangular hone stick of the type used in honing cylinder bores and the like or, for example, could have peripheral teeth for engagement with the teeth of a gear to be honed. Also, the tool could have the general configuration of a shaving tool with the individual cutting edges removed; and in this case, the tool would resemble a worm by which a worm gear is driven. Further yet, the tungsten carbide grit coating could be applied to side faces of the wheel rather than to the peripheral edges, this arrangement being found particularly useful in grinding or abrading rubber or other relatively soft, resilient materials. In general, the tool could take any one of a number of forms, depending on its intended use.

In general, the tool comprises a substrate 12 made of a metal of rigidity and hardness suitable to the specific use of the tool, such materials being, for example, a steel such as 1020 steel or 6150 steel. A layer of tungsten carbide grits 14 is adhered to the operative surface of the substrate by means of a layer 16 of a bonding metal. This metal is one which will form a strong bond with substrate 12 and with tungsten carbide and which has a melting point higher than that of copper. A suitable example of such a material is "Metco" ThermoSpray Powder No. 15C which is a nickel-chromium alloy whose analysis is shown at page 8 of a pamphlet entitled "The Metco Flame Spraying Processes," published by Metallizing Engineering Company, Inc., Westbury, N.Y., in 1960. The melting point of this particular alloy is about 2030° F. to 2050° F. However, it is believed that other bonding metals having melting points in the range of about 2000° F. to 2100° F. would be satisfactory.

In manufacture, it is imperative that the surface 18 of substrate 12 to be coated with the grits be prepared in such a way that layer 16 of the bonding metal will not dislodge from the substrate under relatively great forces acting in a shear direction at the interfacing portions of the layer 16 and substrate surface 18. In particular, it is important that no oxides or other foreign matter exist at surface 18 beneath layer 16. Oxidized areas on surface 18 of the substrate would form centers for the growth of further oxides which would ultimately loosen layer 16 so that it would strip off. Other foreign matter on the substrate surface would interfere with proper formation of a bond between layer 16 and surface 18 so that the layer would strip off.

Figure 2:
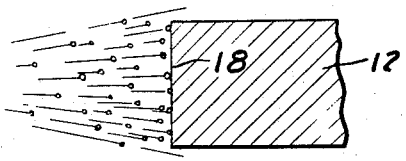
FIG. 2 is a diagrammatic representation of a shot-blasting step in the method.
Figure 3:
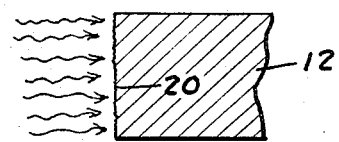
FIG. 3 is a diagrammatic illustration of a subsequent heating step.
Figure 4:
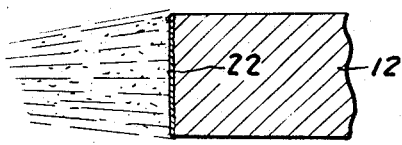
FIG. 4 is a diagrammatic representation of a subsequent metal-spraying step.

The process of preparing surface 18 includes as a preferred step a shot blasting of surface 18 as represented in FIG. 2. Then the shot-blasted surface 20 (FIG. 3) is heated to approximately 200° F. This heating must be done under such conditions as to prevent any substantial formation of oxides on the shot-blasted surface, and the surface must be protected from deposition of other foreign matter. This can be done by placing substrate 12 in an oven immediately after the shot-blasting step and heating the entire substrate in a non-oxidizing atmosphere. Alternatively, surface 20 can be heated by a torch immediately after the shot-blasting step. If the shot-blasting step is performed under such conditions that foreign matter might become deposited on surface 20, this surface, prior to the heating step, should be cleansed with a solvent such as carbon tetrachloride.

While surface 20 is in the heated condition, the nickel-chromium alloy in fused condition is applied over surface 20. This can be done by means of a conventional flame spray or metallizing gun of the general type disclosed in "The Metco Flame Spraying Processes" pamphlet referred to above. The alloy forms an extremely strong bond with surface 20 which is believed to be both a metallurgical bond and a mechanical bond with the roughening of surface 20 caused by the shot blasting. The substrate and alloy are allowed to cool and then the exposed surface of the solidified alloy forms a bonding surface 22.

The depth to which the bonding metal is applied over the substrate depends upon the size of the tungsten carbide grits which are to be adhered thereto. For example, where relatively small grits such as 200–325 mesh grits are to be used, the thickness of the bonding metal is from about .001″ to .003″. For grits of about 100 mesh, the bonding metal thickness is about .004″ to .005″. For 30–40 mesh grits, the thickness of the bonding metal is about .006″ to .008″. For relatively large grits such as ¼″ grits, the thickness of the bonding layer will range from about .010″ to about .015″. For yet larger sizes of grits, even thicker layers of bonding metal may be used.

After the substrate and its layer of bonding metal have been allowed to cool, the grits are temporarily adhered to bonding surface 22 by means of a brazing compound in fluent condition but having enough viscosity or tackiness to hold the grits in place on the bonding surface. One example of a suitable compound comprises Brazing Compound No. 3025, which is a product of Metachem Laboratories, Inc., of Hammond, Ind., to which is added about 20 percent by volume of a flux-containing material such as Brazing Vehicle No. 1, a product of the same company. This mixture is thinned with a suitable solvent such as Brazing Solvent No. 1, product of the same company, to a viscosity which is just great enough to hold the grits on this surface 22.

Figure 5:
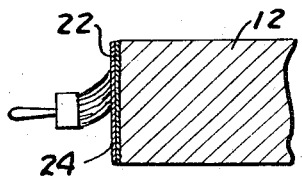
FIG. 5 is a diagrammatic representation of a subsequent step in which the brazing compound is applied.
Figure 6:
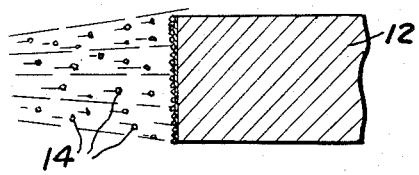
FIG. 6 is a diagrammatic representation of the application of the tungsten carbide grits over the brazing compound layer.
Figure 8:
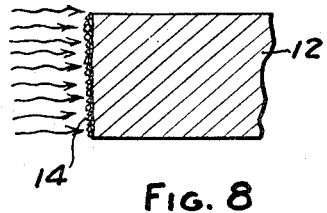
FIG. 8 is a diagrammatic representation of another heating step.

A convenient method of adhering the grits to surface 22 is first to paint or spray a layer 24 of the brazing compound over surface 22 (FIG. 5) and then spray the grits against surface 24 (FIG. 6). Those grits which contact an exposed portion of layer 24 will adhere thereto and those grits which do not contact an exposed portion of surface 24 will fall off. Thus, the grits are applied over layer 24 in substantially a single layer. It is preferable to cool substrate 12 and bonding layer 22 to room temperature before applying layer 24 to avoid causing layer 24 to dry unduly before the grits are sprayed on.

By way of example, when relatively small grits are used, e.g., 200–325 mesh grits, the brazing compound is thinned to a watery consistency; and coating 24 will be about .001″ to .002″ thick. For 20–30 mesh grits, the brazing compound is thinned to a syruppy consistency and layer 24 is about .005″ to .006″ thick. For relatively large grits such as ¼″ grits, the brazing compound is thinned to a muddy consistency, and layer 24 is about .010″ to .015″ thick. For even larger grits, a thicker muddy consistency and thicker layer 24 may be necessary.

Figure 7:
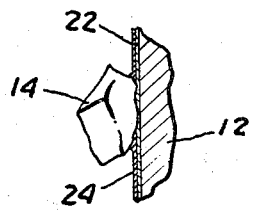
FIG. 7 is a greatly enlarged fragmentary diagrammatic view illustrating the relation between the grits, substrate, and coatings following the spray step of FIG. 6.

The relation of the grits, layers 22, 24, and substrate 12 after the grits have been sprayed on is illustrated in FIG. 7. The substrate, with its layers of bonding metal, brazing compound, and grits, is then subjected to heat so that the layer of bonding metal, brazing compound, and grits is elevated substantially to the melting point of the bonding metal. This is preferably done under such conditions as to prevent oxidation of the materials in these layers, and this can be conveniently performed in a conventional commercial heat-treating furnace having a non-oxidizing atmosphere.

During the heating step, the copper in the brazing compound melts first at somewhat lower than 2,000° F. Then the bonding metal reaches its melting point. When this happens, it would normally be expected that all support for the grits would disappear: that the bonding metal would flow downwardly and wind up in a pool at the bottom of the substrate along with the grits. However, this does not happen.

Figure 9:
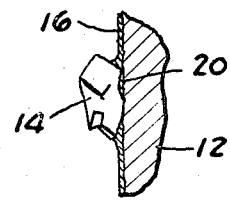
FIG. 9 is a view similar to FIG. 7 but showing the relation of the grits, substrate, and layer material after the latter heating step.

To the contrary, the bonding metal appears suddenly to seize the grits; or conversely, the grits appear suddenly to sink into the bonding metal against the substrate. In any event, the grits and bonding metal remain in place with a fused metal connection being formed therebeween. When the assembly is cooled and the materials forming this connection are solidified, the bond between the grits and bonding metal is extremely strong. It is believed that the relation between the substrate, the resulting layer 16, and grits 14 is similar to the showing in FIG. 9, the grits having migrated to a location closely adjacent surface 20 of the substrate.

The phenomenon described in the preceding paragraph is not completely understood. It is theorized that when the assembly reaches the melting point of copper, the copper in the brazing compound melts and wets the grits, forming an extremely thin layer of copper between the grits and bonding surface 22 and possibly an extremely thin layer over part or all of the exposed portions of the grits themselves. It is also theorized that when the bonding metal begins to melt, it wets the copper-coated areas of the grits and flows around some or all portions of each grit.

Upon microscopic examination of a tool 10, it appears that the individual grits are all partially or completely coated with an extremely thin layer of bonding metal. It is believed that the extent to which the area of each grit is coated may depend on the extent to which its area was coated by the copper and upon the precise temperature attained by the grits and immediately adjacent bonding material during the heating step. In this regard, it is to be noted that this precise temperature will vary slightly depending upon the mass of substrate 12 and the precise heating conditions within the oven.

It is to be noted that during this process, only a very small amount of copper is used, that amount being just enough to wet the grits and form a layer between the grits and bonding surface 22. If too much copper is used, the bond between the grits and bonding metal is weakened and the grits will strip off of the substrate. If not enough copper is used, the bond between the grits and bonding metal is not sufficiently strong, and the grits will strip off.

In general, large grits have larger surface areas than relatively small grits, and more copper must be used for the larger size grits. The method above described for adjusting the viscosity of the brazing compound also adjusts the amount of copper and flux contained in coating 24 and thus provides an extremely convenient method of providing the right amount of copper and flux. However, other methods may be used for providing the correct amounts of copper and flux in association with a substance by which the grits are temporarily adhered to surface 22 without departing from the invention.

In the finished tool, even though grits 14 may carry coatings of the copper and bonding metal, these coatings are extremely thin and do not interfere with the cutting action of the sharp edges of the grits. Thus, the tool is capable of removing metal to depths of several thousandths of an inch from a relatively hard workpiece such as steel.

In actual use, tools made according to the present method have been used in honing gears and other workpieces and both rough and finish grinding of rubber from tires in the course of tire manufacture. Moreover, tools made according to this method and having generally the shape of a smoothed shaving tool have been used in gear and spline manufacture to shave the workpieces after they have been hardened by heat treating, thus accomplishing what no tool has been capable of doing satisfactorily prior to the present invention.

Under normal tool pressures and operating speeds, the tools have not become loaded in the course of work upon hard workpieces of steel or the like. The reason for this is not thoroughly understood, but it is theorized that the myriad tiny cutters formed by the edges of grits 14 remove the metal in chips so minute that insufficient heat is generated at any local area to cause any significant fusion of the chips; that the chips are continually moved about by relative movement of the tool and workpiece, and that the chips themselves provide abrasive action which keeps the spaces between the cutters scrubbed out. Whether this is the correct explanation or not, however, the fact is that the tool does not normally become loaded during use.

Tools made according to this invention wear uniformly and at predictable rates and do not crumble or disintegrate in the course of use. Moreover, they are far more durable and less expensive than conventional grinding tools and shaving tools.

The bonding force between the grits and substrate is so strong that the grits are not pulled away from the substrate by the relatively high forces in a shear direction incidental to honing, grinding, or shaving of a workpiece. Moreover, tools used to cut rubber in tire manufacture have been rotated in excess of 17,000 s.f.p.m., and the grit layer has withstood the combined effects of the shear force and the centrifugal force thereon.

I claim:
1. The method of making a tool having a surface capable of cutting workpieces of relatively hard material such as ferrous metals and relatively soft, resilient material such as rubber, said method comprising:

providing a metal substrate having a surface layer of a nickel-chromium alloy bonding metal with which tungsten carbide will form a bond and which has a melting point higher than that of copper, providing a brazing compound in fluent form which contains copper in an amount less than that required to form a brazed connection between two bodies, engaging a multiplicity of discrete tungsten carbide grits against said surface layer with a coating of said copper compound disposed between said grits and surface, heating said surface, compound, and grits to the melting point of copper and thereby causing the copper in said brazing compound to wet said surface and grits, then further heating said surface, compound, and grits at least to the melting point of said bonding metal, and thereby causing a fused metal connection to form between said grits and bonding metal, and then cooling the assembly thereby formed to solidify the metal forming said connection.

2. The method of making a tool having a surface capable of cutting workpieces of relatively hard material such as ferrous metals and relatively soft, resilient material such as rubber, said method comprising:

providing a metal substrate, providing over a surface portion of said substrate a layer of a nickel-chromium alloy having a melting point in the range from about 2,000° F. to about 2,100° F., said layer being applied to a thickness of at least in the range from about .001″ to .003″ thick, providing a brazing compound in fluent form which contains copper in an amount less than that required to form a brazed connection between two bodies, applying a coating of said copper compound over the surface of said alloy layer, applying a layer of discrete tungsten carbide grits over said surface so coated, and utilizing said compound to adhere said grits to said surface, the thickness of said coating ranging from about .001″ to .003″ for small grits of 200–325 mesh, to at least about .010″ to .015″ for large grits of ¼″ and larger mesh, heating said alloy, compound, and grits to the melting point of copper and thereby causing the copper in said compound to wet said surface and grits, then further heating said alloy, compound, and grits at least to the melting point of said alloy and thereby causing a fused metal connection to form between said grits and alloy, and then cooling the assembly thereby formed to solidify the metal forming said connection.

3. The method defined in claim 1 wherein said copper compound is utilized to adhere said grits to said surface prior to the heating step.

4. The method defined in claim 3 wherein said copper compound is first applied as a coating to said surface and said grits are applied over said surface so coated.

5. The method defined in claim 3 wherein said copper compound has a viscosity sufficient only to cause said grits to adhere to said surface.

6. The method defined in claim 4 wherein said copper compound is applied to said surface to a depth ranging from about .001″ to .002″ thick for small grits of 200–325 mesh grits, to at least about .010″ to .015″ thick for large grits of ¼″ grits.

7. The method defined in claim 1 wherein said heating is performed in a furnace having a non-oxidizing atmosphere.

8. The method defined in claim 1 wherein the melting point of said alloy is in the range from about 2,000° F. to about 2,100° F.

9. The method defined in claim 1 and including in addition the steps of preparing a surface portion of said substrate for reception of said bonding metal by shot blasting said surface portion and then, while protecting the shot-blasted portion, heating said surface portion, and then applying said bonding metal in fused condition over said shot blasted surface portion of said substrate.

10. The method defined in claim 9 wherein said bonding metal is applied in the form of a spray.

11. The method defined in claim 9 wherein said bonding metal is cooled to room temperature prior to the application thereto of said copper compound and grits.

12. The method defined in claim 1 wherein said bonding metal is applied as a layer over said substrate to a depth ranging from about .001″ to .003″ for small grits of 200–325 mesh grits, to at least about .010″ to .015″ for large grits of ¼″ and larger grits.

13. The method defined in claim 2 and including in addition the steps of preparing a surface portion of said substrate for reception of said alloy layer by shot blasting said surface portion and then, while protecting the shot-blasted portion, heating said surface portion, and then applying said alloy in fused condition over said shot blasted surface portion of said substrate, and then cooling said alloy substantially to room temperature.

14. The method defined in claim 13 wherein said alloy is applied in the form of a spray.

15. A tool made in accordance with the method defined in claim 2.

References Cited

UNITED STATES PATENTS

| | | | |
|---|---|---|---|
| 2,833,638 | 5/1958 | Owen | 51—309 |
| 2,906,612 | 9/1959 | Anthony et al. | 51—309 |
| 3,248,189 | 4/1966 | Harris | 51—309 |

OTHER REFERENCES

"The Metco Flame Spraying Processes" (1960), Metco Inc., Bulletin 136B 30M-2/60, 13 pages.

DONALD J. ARNOLD, *Primary Examiner.*